US012778035B2

(12) United States Patent
Chang et al.

(10) Patent No.: US 12,778,035 B2
(45) Date of Patent: Nov. 3, 2026

(54) ***HOUTTUYNIA CORDATA* HYDROPONIC CULTURE MEDIUM AND SYSTEM**

(71) Applicant: WE-WIN BIO-MEDICAL CO., LTD., Kaohsiung (TW)

(72) Inventors: Fang-Rong Chang, Kaohsiung (TW); Wei-Hung Wu, Kaohsiung (TW); Yi-Hong Tsai, Kaohsiung (TW); Chung-Hsien Chen, Kaohsiung (TW); Yen-Chi Loo, Kaohsiung (TW); Hsueh-Er Chen, Kaohsiung (TW); Yen-Chang Chen, Kaohsiung (TW); Hui-Ping Hsieh, Kaohsiung (TW); Chen Hsieh, Kaohsiung (TW)

(73) Assignee: WE-WIN BIO-MEDICAL CO., LTD., Kaohsiung (TW)

( * ) Notice: Subject to any disclaimer, the term of this patent is extended or adjusted under 35 U.S.C. 154(b) by 0 days.

(21) Appl. No.: 18/956,346

(22) Filed: Nov. 22, 2024

(65) Prior Publication Data

US 2025/0081904 A1 Mar. 13, 2025

Related U.S. Application Data

(63) Continuation-in-part of application No. 18/121,126, filed on Mar. 14, 2023, now abandoned.

(30) Foreign Application Priority Data

Jun. 7, 2022 (TW) ................................. 111121087

(51) Int. Cl.

| | |
|---|---|
| ***A01G 24/22*** | (2018.01) |
| ***A01G 22/00*** | (2018.01) |
| ***A01G 31/02*** | (2006.01) |

(52) U.S. Cl.
CPC ............ *A01G 24/22* (2018.02); *A01G 22/00* (2018.02); *A01G 31/02* (2013.01)

(58) Field of Classification Search
None
See application file for complete search history.

(56) References Cited

U.S. PATENT DOCUMENTS 5,385,589 A * 1/1995 Kratky .................. A01G 31/02 47/64
6,088,958 A * 7/2000 Oka ...................... A01G 31/02 47/62 R (Continued)

FOREIGN PATENT DOCUMENTS

EP 3837968 A1 * 6/2021 .......... A01G 9/0295

*Primary Examiner* — William L Gmoser
(74) *Attorney, Agent, or Firm* — Troutman Pepper Locke LLP; Tim Tingkang Xia, Esq.

(57) ABSTRACT

The present invention generally relates to a hydroponic culture medium and a hydroponic planting system, more particularly to a *Houttuynia cordata* hydroponic culture medium, a *Houttuynia cordata* hydroponic planting system, *Houttuynia cordata* extracts, a method, and applications thereof. The *Houttuynia cordata* hydroponic culture medium includes a plant fertilizer and a *Houttuynia cordata* growth-promoting additive. The *Houttuynia cordata* growth-promoting additive is selected from the group consisting of: vitamin B complex, seaweed essence, amino acid, microorganism, and a combination thereof. An electronic conductivity of the *Houttuynia cordata* hydroponic culture medium is between 0.4 ms/cm and 2.0 ms/cm.

6 Claims, 6 Drawing Sheets

(56) References Cited

U.S. PATENT DOCUMENTS

| | | | | |
|---|---|---|---|---|
| 11,981,611 | B2 * | 5/2024 | McKnight | C05G 3/90 |
| 2018/0000028 | A1 * | 1/2018 | Suntych | A01G 24/28 |
| 2019/0246591 | A1 * | 8/2019 | Leo | A01G 2/10 |
| 2021/0368691 | A1 * | 12/2021 | Bellamy | B09C 1/08 |
| 2023/0058483 | A1 * | 2/2023 | Cheung | A01G 24/27 |
| 2023/0380359 | A1 * | 11/2023 | Vergeldt | A01G 9/247 |

* cited by examiner

*HOUTTUYNIA CORDATA* HYDROPONIC CULTURE MEDIUM AND SYSTEM

CROSS-REFERENCE TO RELATED APPLICATIONS

This non-provisional application is a continuation-in-part of U.S. patent application Ser. No. 18/121,126 filed on Mar. 14, 2023, which claims priority under 35 U.S.C. § 119(a) on Taiwan Patent Application No. 111121087 filed on Jun. 7, 2022, the entire contents of which are hereby incorporated by reference.

BACKGROUND OF THE INVENTION

1. Field of the Invention

The present invention generally relates to a hydroponic culture medium and a hydroponic planting system, more particularly to a *Houttuynia cordata* hydroponic culture medium and a *Houttuynia cordata* hydroponic planting system.

2. Description of the Prior Art

*Houttuynia cordata* is a high-value Chinese herbal crop with anti-inflammation and anti-virus properties, and also used in medicine and food. *Houttuynia cordata* Thunb, which belongs to the Saururaceae family, can be derived from either the fresh or dried aerial portions of the plant (whole herb). The Latin pharmaceutical name is Houttuyniae Herba.

However, the domestic supply of *Houttuynia cordata* is mainly from China, and most of them are planted through traditional soil cultivation. However, the crop quality and production capacity may be bothered deeply due to the key factors that affects the traditional soil cultivation, which are the varieties of climates and environments.

Therefore, there are a few traders who use closed fields with hydroponic planting technology, Internet and big data growth control systems to form smart agriculture solutions, but they are all closed plant factory application mode. As it is known that, crop growth requires not only nutrients and water, but also the sunlight. Currently, plant factories always consume a lot of electricity on LED lighting equipment, so as to make a very high cost for planting *Houttuynia cordata*. For the "hydroponic nutrient solution" required in the hydroponic planting mode, there is currently no nutrient medium developed for the nutrient ratio and composition differences in the growth process of *Houttuynia cordata*. Therefore, the production rate of cultivated crops could not be effectively increased to meet the industry demands; therefore, in view of the shortcomings in the prior arts, the applicant of this case finally conceived this case after careful research and experimentation, and in the spirit of perseverance, to overcome the deficiencies of the previous technology, the following is a brief description of the present invention.

SUMMARY OF THE INVENTION

The main purpose of the present invention provides a *Houttuynia cordata* hydroponic culture medium that has a plant fertilizer and a *Houttuynia cordata* growth-promoting additive, wherein the *Houttuynia cordata* growth-promoting additive is selected from the groups consisting of: vitamin B complex, seaweed essence, amino acid, microorganism, and a combination thereof.

Preferably, a pH value of the *Houttuynia cordata* hydroponic culture medium is between 5.5 and 7.0.

Preferably, an electronic conductivity of the *Houttuynia cordata* hydroponic culture medium is between 0.4 ms (milli Siemen)/cm and 2.0 ms/cm.

Preferably, the microorganism is selected from the groups consisting of: *Azotobacter*, lactic acid bacteria, phosphate solubilizer, yeast, potassium solubilizer, *Bacillus subtilis*, and a combination thereof.

Preferably, the *Houttuynia cordata* hydroponic culture medium further comprises natural plant extracts, which are extracted from one of the groups consisting of: *Houttuynia cordata* leaf, camphor leaf, juniper leaf, Incense Cedar leaf, and a combination thereof.

The other purpose of the present invention is to provide a *Houttuynia cordata* hydroponic planting system, which has a cultivating carrier, comprising a case and an accommodation room wrapped around by the case, a translucent portion being disposed on the case, in order for sunlight to go through the translucent portion to irradiate into the accommodation room to shine upon *Houttuynia cordata*; a hydroponic module, disposed in the accommodation room of the cultivating carrier, and comprising at least one hydroponic culture medium tank for planting the *Houttuynia cordata*; and a *Houttuynia cordata* hydroponic culture medium storage device, connecting with the hydroponic module, wherein the *Houttuynia cordata* hydroponic culture medium storage device provides a *Houttuynia cordata* hydroponic culture medium, which is supplemented to the hydroponic culture medium tank by means of the *Houttuynia cordata* hydroponic culture medium storage device, the *Houttuynia cordata* hydroponic culture medium comprising a plant fertilizer and a *Houttuynia cordata* growth-promoting additive, wherein the *Houttuynia cordata* growth-promoting additive is selected from the groups consisting of: vitamin B complex, seaweed essence, amino acid, microorganism, and a combination thereof.

Preferably, a pH value of the *Houttuynia cordata* hydroponic culture medium is between 5.5 and 7.0, an electricity conductivity value of the *Houttuynia cordata* hydroponic culture medium is between 0.4 ms/cm and 2.0 ms/cm, and the microorganism is selected from the group consisting of: *Azotobacter*, lactic acid bacteria, phosphate solubilizer, yeast, potassium solubilizer, *Bacillus subtilis*, and a combination thereof.

The other object of the present invention is to provide a *Houttuynia cordata* extract comprising flavonoids and caffeic acid derivatives, wherein a concentration of the *Houttuynia cordata* extract acting on an chromatographic fingerprint of chemical markers is 1 mg/1 mL solvent, in order to obtain the caffeic acid derivatives corresponding to a retention time between 8 and 13, a peak area of the retention time of the caffeic acid derivative ranges from 447834 to 1689264, and flavonoids corresponding to the retention time between 17.5 and 19.5 and the retention time between 23.5 and 24.5, and the peak area of the retention time of the flavonoids is between 265716 and 2229774, wherein a method for manufacturing the *Houttuynia cordata* extract comprises that of: providing a *Houttuynia cordata* hydroponic culture medium to a *Houttuynia cordata* by means of hydroponic planting, wherein the *Houttuynia cordata* hydroponic culture medium comprises a plant fertilizer and a *Houttuynia cordata* growth-promoting additive, and the *Houttuynia cordata* growth-promoting additive is selected from the groups consisting of: vitamin B complex, seaweed essence, amino acid, microorganism, and a combination thereof; adopting a *Houttuynia cordata* hydroponic planting system to hydroponically plant the *Houttuynia cordata*, wherein the *Houttuynia cordata* hydroponic planting system comprises a *Houttuynia cordata* hydroponic culture medium storage device for sunlight shining upon the *Houttuynia cordata*; and extracting the *Houttuynia cordata* by ethanol to obtain the *Houttuynia cordata* extract, wherein the *Houttuynia cordata* is processed by the *Houttuynia cordata* hydroponic planting system and the *Houttuynia cordata* hydroponic culture medium.

The other object of the present invention is to provide a method for manufacturing *Houttuynia cordata* extracts comprising: providing a *Houttuynia cordata* hydroponic culture medium to a *Houttuynia cordata* by means of hydroponic planting, wherein the *Houttuynia cordata* hydroponic culture medium comprises a plant fertilizer and a *Houttuynia cordata* growth-promoting additive, and the *Houttuynia cordata* growth-promoting additive is selected from the groups consisting of: vitamin B complex, seaweed essence, amino acid, microorganism, and a combination thereof; adopting a *Houttuynia cordata* hydroponic planting system to hydroponically plant the *Houttuynia cordata*, wherein the *Houttuynia cordata* hydroponic planting system comprises a *Houttuynia cordata* hydroponic culture medium storage device for sunlight shining upon the *Houttuynia cordata*; and extracting the *Houttuynia cordata* by ethanol to obtain the *Houttuynia cordata* extract, wherein the *Houttuynia cordata* is processed by the *Houttuynia cordata* hydroponic planting system and the *Houttuynia cordata* hydroponic culture medium; wherein the *Houttuynia cordata* extract comprising flavonoids and caffeic acid derivatives, and a concentration of the *Houttuynia cordata* extract acting on an chromatographic fingerprint of chemical markers is 1 mg/1 mL solvent, in order to obtain the caffeic acid derivatives corresponding to a retention time between 8 and 13, a peak area of the retention time of the caffeic acid derivative ranges from 447834 to 1689264, and flavonoids corresponding to the retention time between 17.5 and 19.5 and the retention time between 23.5 and 24.5, and the peak area of the retention time of the flavonoids is between 265716 and 2229774.

The other object of the present invention is to provide a *Houttuynia cordata* extract for preparing compositions with antiviral, anti-inflammatory, antitumor, antioxidative and antibacterial effects, wherein a method for manufacturing *Houttuynia cordata* extracts comprising that of: providing a *Houttuynia cordata* hydroponic culture medium to a *Houttuynia cordata* by means of hydroponic planting, wherein the *Houttuynia cordata* hydroponic culture medium comprises a plant fertilizer and a *Houttuynia cordata* growth-promoting additive, and the *Houttuynia cordata* growth-promoting additive is selected from the groups consisting of: vitamin B complex, seaweed essence, amino acid, microorganism, and a combination thereof; adopting a *Houttuynia cordata* hydroponic planting system to hydroponically plant the *Houttuynia cordata*, wherein the *Houttuynia cordata* hydroponic planting system comprises a *Houttuynia cordata* hydroponic culture medium storage device for sunlight shining upon the *Houttuynia cordata*; and the *Houttuynia cordata* extract comprising flavonoids and caffeic acid derivatives, and a concentration of the *Houttuynia cordata* extract acting on an chromatographic fingerprint of chemical markers is 1 mg/1 mL solvent, in order to obtain the caffeic acid derivatives corresponding to a retention time between 8 and 13, a peak area of the retention time of the caffeic acid derivative ranges from 447834 to 1689264, and flavonoids corresponding to the retention time between 17.5 and 19.5 and the retention time between 23.5 and 24.5, and the peak area of the retention time of the flavonoids is between 265716 and 2229774.

The *Houttuynia cordata* hydroponic culture medium and the *Houttuynia cordata* hydroponic planting system provided by the present invention have following advantages listed below:

1. The *Houttuynia cordata* hydroponic culture medium from the present invention can effectively speed up the growth of the *Houttuynia cordata* according to the ingredients thereof. The growth cycle (planting to harvest) of the *Houttuynia cordata* through the hydroponic planting is almost half of the traditional soil cultivation. In other words, the production of the present invention is at least twice (including more) of the traditional soil cultivation, so it can successfully increase the production capacity to meet industrial demands.
2. The *Houttuynia cordata* hydroponic planting system of the present invention is advanced by traditional container by replacing LED equipment with natural sunlight to shine upon the *Houttuynia cordata*. Hence, the present invention saves a large number of costs compared with the present hydroponic planting system.
3. The planted *Houttuynia cordata* from aforesaid *Houttuynia cordata* hydroponic culture medium and *Houttuynia cordata* hydroponic planting system are extracted through air-drying, powdering, adding ethanol for extraction, ultrasonic vibration, filtration, and solvent removal to obtain the *Houttuynia cordata* extract, which contains the high ingredients of flavonoids and caffeic acid derivatives. Therefore, the *Houttuynia cordata* extract successfully prepares compositions with antiviral, anti-inflammatory, antitumor, antioxidative and antibacterial effects.

Other and further features, advantages, and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein.

DETAILED DESCRIPTION OF THE INVENTION

Figure 1:
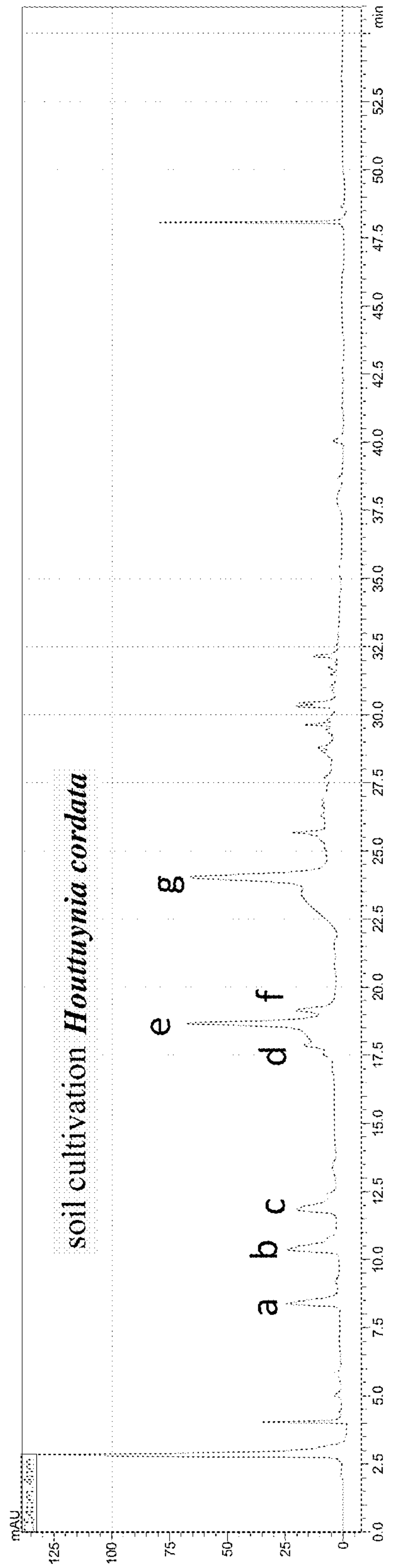
FIG. 1 illustrates a chromatographic fingerprint of bioactive chemical markers of a soil cultivation *Houttuynia cordata;*
Figure 2A:
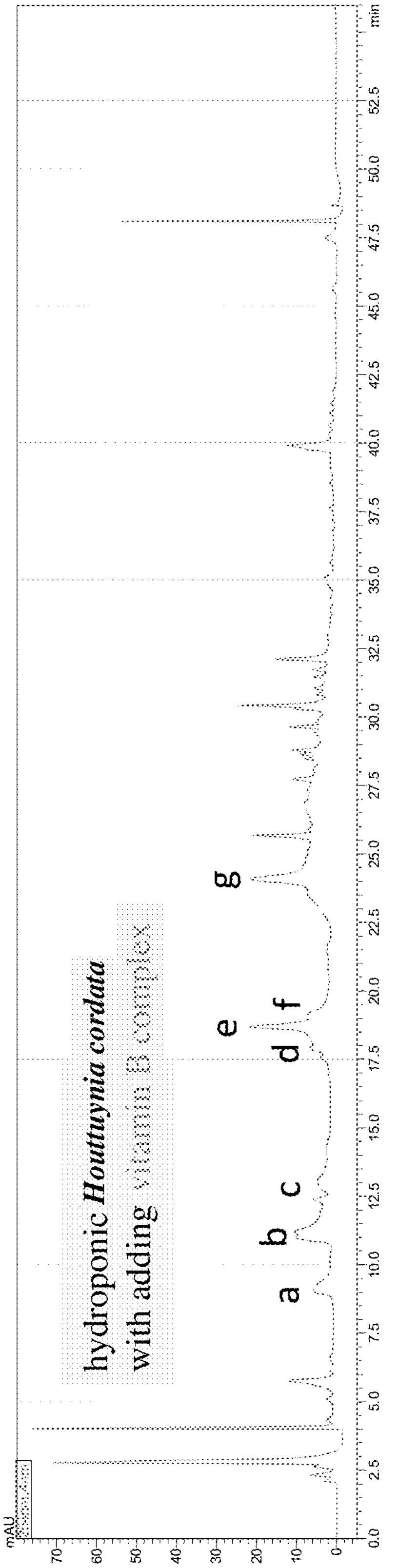
FIG. 2A illustrates a chromatographic fingerprint of bioactive chemical markers of the hydroponic *Houttuynia cordata* with adding vitamin B complex of the present invention.
Figure 2B:
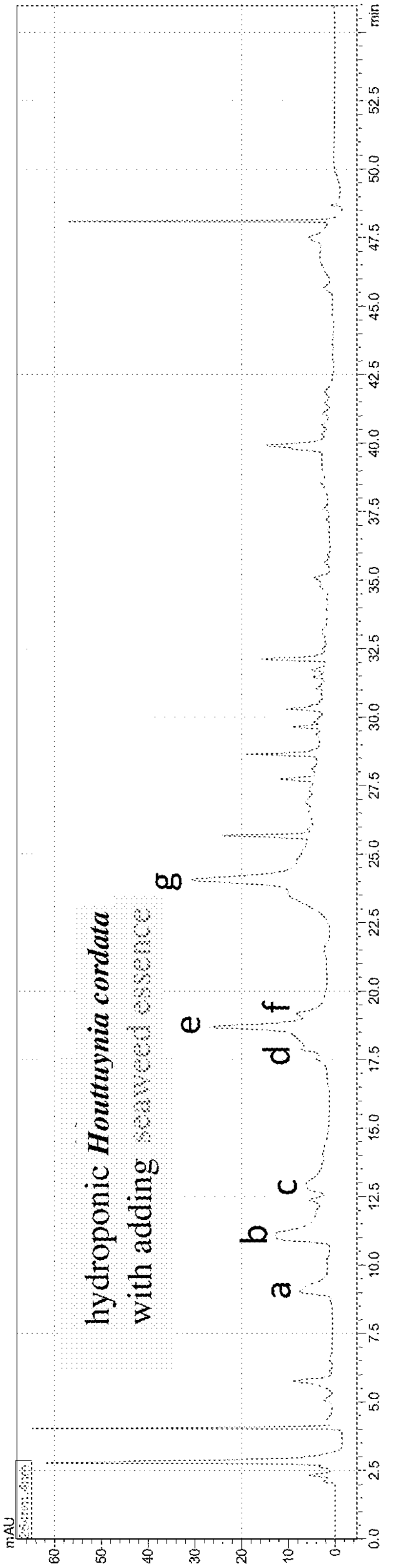
FIG. 2B illustrates a chromatographic fingerprint of bioactive chemical markers of the hydroponic *Houttuynia cordata* with adding seaweed essence of the present invention.
Figure 2C:
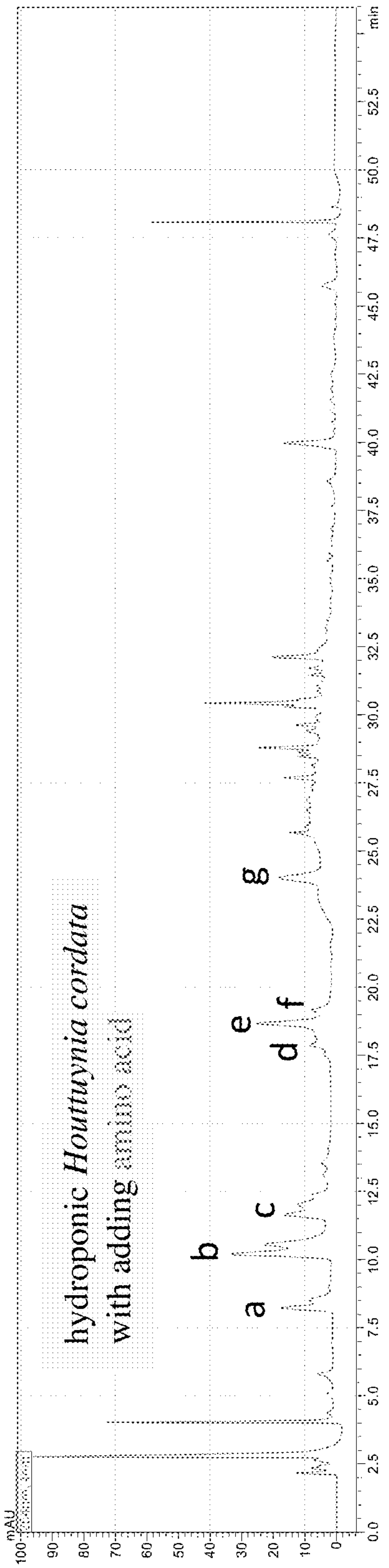
FIG. 2C illustrates a chromatographic fingerprint of bioactive chemical markers of the hydroponic *Houttuynia cordata* with adding amino acid of the present invention.
Figure 2D:
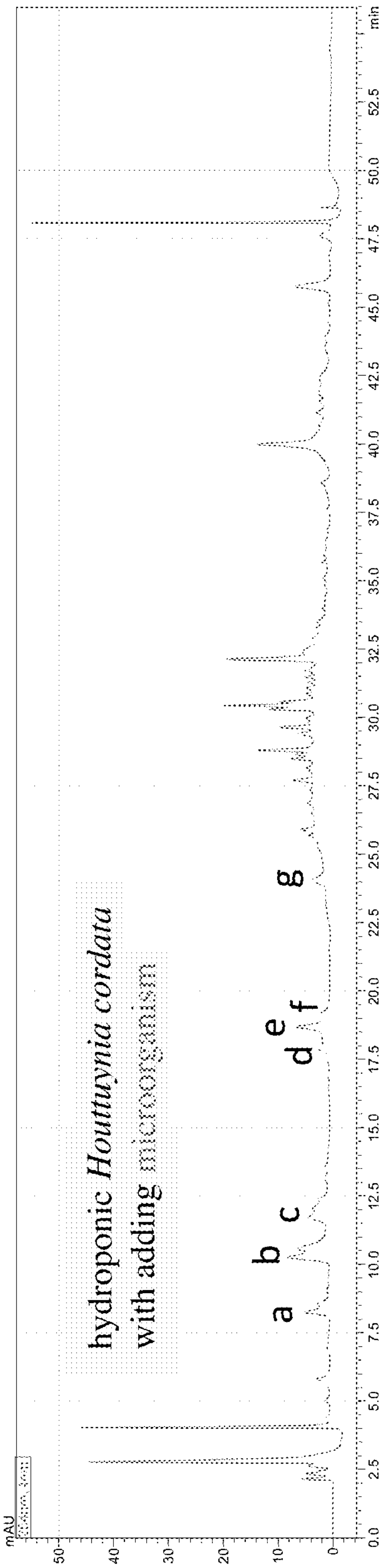
FIG. 2D illustrates a chromatographic fingerprint of bioactive chemical markers of the hydroponic *Houttuynia cordata* with adding microorganism of the present invention.

Following preferred embodiments and figures will be described in detail so as to achieve aforesaid objects.

To achieve above objectives, the present invention provides an embodiment that is a *Houttuynia cordata* hydroponic culture medium, and it has plant fertilizers and a *Houttuynia cordata* growth-promoting additive, wherein the *Houttuynia cordata* growth-promoting additive is selected from the groups consisting of: vitamin B complex, seaweed essence, amino acid, microorganism, and a combination thereof.

In this embodiment, the plant fertilizers include three elements, such as nitrogen, phosphate, potassium, etc., which are generally called essential nutrients. The *Houttuynia cordata* growth-promoting additive is beneficial to the growth of *Houttuynia cordata*. For example, vitamin B complex is a nutrient for biological maintenance of physiological metabolism, and it is able to improve the good growth vigor of the leaves and roots of plants. For instance, seaweed extract is a natural extract from seaweed, and it is rich in various forms of nutrients and trace elements, and also contains a variety of natural plant growth regulators. The natural auxin and cytokinin contained in it have a development-inducing effect on plant roots and leaves. For example, amino acid is an organic acid, which contains nitrogen for accelerating the growth of plants and making the roots develop vigorously, in order to achieve the effect of strengthening rooting. Another example, microorganisms are additives used to provide nutrient sources during plant growth, and they increase the overall growth and absorption speed of crops, and rapidly enhance the growth of roots. Microorganisms include *Azotobacter*, lactic acid bacteria, phosphate solubilizer, yeast, potassium solubilizer, *Bacillus subtilis*, etc. and other single or unlimited strains of combined flora.

Besides, for some embodiments, the *Houttuynia cordata* hydroponic culture medium further comprises natural plant extracts, which are extracted from one of the groups consisting of: *Houttuynia cordata* leaf, camphor leaf, juniper leaf, Incense Cedar leaf, and a combination thereof. The natural plant extracts can be another role of extra nutrient supplement in the *Houttuynia cordata* hydroponic culture medium for providing elements required for the growth of *Houttuynia cordata*.

The pH value and electronic conductivity of the *Houttuynia cordata* hydroponic culture medium may affect the growth of the *Houttuynia cordata*. Therefore, by way of the pH value and electronic conductivity, the pH value and concentration of the hydroponic culture medium are monitored, and whether the hydroponic culture medium is supplemented is a judgement simultaneously. The pH value of the *Houttuynia cordata* hydroponic culture medium is between 5.5 and 7.0, preferably is 5.5, 5.6, 5.7, 5.8, 5.9, 6.0, 6.1, 6.2, 6.3, 6.4, 6.5, 6.6, 6.7, 6.8, 6.9, or 7.0, and the electronic conductivity of the *Houttuynia cordata* hydroponic culture medium is between 0.4 ms/cm and 2.0 ms/cm, preferably 0.4 ms/cm, 0.5 ms/cm, 0.6 ms/cm, 0.7 ms/cm, 0.8 ms/cm, 0.9 ms/cm, 1.0 ms/cm, 1.1 ms/cm, 1.2 ms/cm, 1.3 ms/cm, 1.4 ms/cm, 1.5 ms/cm, 1.6 ms/cm, 1.7 ms/cm, 1.8 ms/cm, 1.9 ms/cm, or 2.0 ms/cm. In case of the electronic conductivity being lower than the range, nutrients are easily lacked so as to affect the growth of crops. On the other hand, if the pH value is lower than the range of 5.5 to 7.0, the absorption of corps is decreased so as to also affect the growth; on the contrary, if it exceeds this range, the problem of precipitation of metal elements in the culture medium will occur. The present invention effectively promotes the growth of the *Houttuynia cordata* by means of controlling the pH value and electrical conductivity.

Through controlling aforesaid *Houttuynia cordata* growth-promoting additivity, natural plant extract, pH value, and electrical conductivity, the growth cycle (planting to harvest) of the *Houttuynia cordata* through the hydroponic planting falls within 30-45 days. Compared to the traditional soil cultivation, the present invention reduces the growth cycle about one time, since the harvest time of traditional soil cultivation is about 60-90 days. The production of the hydroponic planting rose to one time of the traditional soil cultivation (and/or above). The sizes of the leaves of both the hydroponic planting and the soil cultivation are around 7-7.5 cm while in harvest. Please refer to Table 1, which shows the experiment data of the leaf growth record of the hydroponic planting and the soil cultivation.

TABLE 1

| Recoding Date | Hydroponics with Vitamin B Complex | Hydroponics with Seaweed Essence | Hydroponic with Amino Acids | Hydroponics with Microorganisms | Traditional Soil Cultivation |
|---|---|---|---|---|---|
| leaf growth changes | 3.0 cm to 7.0~7.5 cm | | | | 3.0 cm to 6.5~7 cm |
| Day 0 | 3.0 cm (Start Planting) | | | | 3.0 cm (Start Planting) |
| Day 14 | 4.4 cm | 4.6 cm | 4.0 cm | 3.9 cm | — |
| Day 26 | 5.7 cm | 6.0 cm | 5.1 cm | 5.4 cm | — |
| Day 30 | — | — | — | — | 3.7 cm |
| Day 44 | — | — | — | — | 4.6 cm |
| Day 45 | 7.2 cm (Harvest) | 7.5 cm (Harvest) | 6.0 cm (Not up to Standard) | 6.2 cm (Not up to Standard) | — |
| Day 56 | — | — | — | — | 5.7 cm |
| Day 60 | — | | 7.3 cm (Harvest) | 7.2 cm (Harvest) | — |
| Day 75 | — | | — | — | 6.8 cm (Harvest) |

According to researches, the bioactive chemical markers contained in *Houttuynia cordata* include caffeic acid derivatives, and there are three types of caffeic acid derivatives, namely 5-O-caffeoylquinic acid, 3-O-caffeoylquinic acid and 4-O-caffeoylquinic acid. By way of the qualitative and quantitative analysis of the bioactive chemical markers of *Houttuynia cordata*, the chromatographic fingerprint of

*Houttuynia cordata* can be obtained. Therefore, the chromatographic fingerprint is able to compare the ratio differences of the bioactive chemical markers of the soil cultivation and the hydroponic planting.

With reference to FIG. 1, which illustrates a chromatographic fingerprint of the bioactive chemical markers of the soil cultivation. As shown in FIG. 1, the peaks labeled with a, b, and c respectively represent 5-O-caffeoylquinic acid, 3-O-caffeoylquinic acid and 4-O-caffeoylquinic acid. Regarding FIG. 2A to FIG. 2D, which represent the chromatographic fingerprints of the bioactive chemical markers of the *Houttuynia cordata* of cultivated with vitamin B complex, seaweed essence, amino acid, and microorganism, respectively. In this regard, the peaks labeled with a, b, and c respectively represent 5-O-caffeoylquinic acid, 3-O-caffeoylquinic acid and 4-O-caffeoylquinic acid. To analyze the content ratio of the bioactive chemical markers on the chromatographic fingerprints of FIG. 1 and FIG. 2A~2D, that is to process the quantitative analyses to the peaks a, b and c, some data are gained as shown in table 2. Regarding table 2, the sum of caffeic acid derivatives of the chemical markers No. a, b and c of the hydroponic *Houttuynia cordata* with adding amino acid is the highest, and it is 132.69% of the soil cultivation *Houttuynia cordata*. The caffeic acid derivatives of the chemical marker No. b of the hydroponic *Houttuynia cordata* with adding vitamin B complex and seaweed essence are 86.01% and 99.55%, respectively. It can be seen that compared with the results of traditional soil cultivation, the hydroponic *Houttuynia cordata* of the present invention is not only very close to the ratio of the bioactive chemical markers of those in traditional soil cultivation, but the results of some hydroponic additives can also be better than traditional soil cultivation. In addition, the growth speed of the hydroponic *Houttuynia cordata* of the present invention is at least twice that of traditional soil cultivation, so it brings great economic benefits and application values.

TABLE 2

| | | | Soil | Hydroponic *Houttuynia cordata* Adding With Growth-promoting Additive | | | |
|---|---|---|---|---|---|---|---|
| No. | Chemical markers | Content | Cultivation *Houttuynia cordata* | Vitamin B complex | Seaweed essence | Amino acid | Micro-organism |
| a | 5-O-caffeoylquinic acid | Peak Area | 373625 | 158789 | 194435 | 312210 | 85028 |
| | | % | 100 | 42.5 | 52.04 | 83.56 | 22.76 |
| b | 3-O-caffeoylquinic acid | Peak Area | 460789 | 396322 | 458718 | 912862 | 240931 |
| | | % | 100 | 86.01 | 99.55 | 198.11 | 52.29 |
| c | 4-O-caffeoylquinic acid | Peak Area | 438649 | 169779 | 233257 | 464192 | 121875 |
| | | % | 100 | 38.70 | 53.18 | 105.82 | 27.78 |
| sum | caffeic acid derivatives | Peak Area | 1273063 | 724890 | 886410 | 1689264 | 447834 |
| | | % | 100 | 56.94 | 69.63 | 132.69 | 35.18 |

Based on researches, one of the bioactive chemical markers of *Houttuynia cordata* are flavonoids, which are rutin, quercetin-3-galactoside, quercetin-3-glucoside, and quercetin-3-rhamnoside. Through qualitative and quantitative analyses to the bioactive chemical markers of *Houttuynia cordata*, the chromatographic fingerprint for *Houttuynia cordata* is obtained. Thus, the ratio differences of the bioactive chemical markers of the soil cultivation *Houttuynia cordata* and the hydroponic *Houttuynia cordata* can be compared via the chromatographic fingerprints.

With reference to FIG. 1, which illustrates a chromatographic fingerprint of the bioactive chemical markers of the soil cultivation *Houttuynia cordata*. As shown in figure, the peaks d, e, f, and g represent rutin, quercetin-3-galactoside, quercetin-3-glucoside, and quercetin-3-rhamnoside individually. Regarding to FIG. 2A~2D, which illustrate chromatographic fingerprints of the bioactive chemical markers of the *Houttuynia cordata* adding vitamin B complex, seaweed essence, amino acid and microorganism. The analyzed chromatographic fingerprints of FIG. 1 and FIG. 2A~2D in the content ratio of the bioactive chemical markers, that is, the quantitative analysis of the peaks d, e, and f are engaged in, and the obtained data are shown in table 3. According to table 3, the sum of flavonoids of No. (peak) d, e, f and g of the chemical markers of the hydroponic *Houttuynia cordata* with adding seaweed essence is the highest, which is 70.31% of the soil cultivation *Houttuynia cordata*; and the content of flavonoids of No. (peak) g of the chemical markers of the hydroponic *Houttuynia cordata* with adding seaweed essence is 92.99% of the soil cultivation *Houttuynia cordata*. Accordingly, the ratio of the bioactive chemical markers of the hydroponic additive such as seaweed essence can be different with the soil plants after comparing the two planting methods. On the other hand, the growth rate of the hydroponic *Houttuynia cordata* of the present invention is at least twice of the traditional soil cultivation plants. Hence, the combination result of the growth rate and the ratio of the chemical markers indicates that the yield of the chemical markers of the hydroponic *Houttuynia cordata* per time-unit is at least 1.4 times than that of the soil cultivation plants, which brings more economic benefits and application values.

TABLE 3

| No. | Chemical markers | Content | Soil Cultivation *Houttuynia cordata* | Hydroponic *Houttuynia cordata* Adding With Growth-promoting Additive: Vitamin B complex | Seaweed essence | Amino acid | Micro-organism |
|---|---|---|---|---|---|---|---|
| d | rutin | Peak Area | 198826 | 85405 | 95481 | 113581 | 31149 |
| | | % | 100 | 42.95 | 48.02 | 57.13 | 15.67 |
| e | quercetin-3-galactoside | Peak Area | 1248080 | 482718 | 618528 | 498391 | 122370 |
| | | % | 100 | 38.68 | 49.56 | 39.93 | 9.80 |
| f | quercetin-3-glucoside | Peak Area | 246306 | 114240 | 141220 | 107016 | 25715 |
| | | % | 100 | 46.38 | 57.34 | 43.45 | 10.44 |
| g | quercetin-3-rhamnoside | Peak Area | 1478110 | 658976 | 1374545 | 437446 | 86482 |
| | | % | 100 | 44.58 | 92.99 | 29.59 | 5.85 |
| sum | flavonoids | Peak Area | 3171322 | 1341339 | 2229774 | 1156434 | 265716 |
| | | % | 100 | 42.30 | 70.31 | 36.47 | 8.38 |

Another target of the present invention is to provide a *Houttuynia cordata* hydroponic planting system 4. Regarding FIG. 3, the system 4 includes a cultivating carrier 41, a hydroponic module 42 and a *Houttuynia cordata* hydroponic culture medium storage device 43. The *Houttuynia cordata* hydroponic culture medium storage device 43 is connected with the hydroponic module 42, in order to supply the *Houttuynia cordata* hydroponic culture medium to the hydroponic module 42. For the present embodiment, there are four sets of the hydroponic modules 42 and the *Houttuynia cordata* hydroponic culture medium storage devices 43 disposed in the cultivation carrier 41.

The cultivating carrier 41 includes a case 411 and an accommodation room 412 wrapped around by the case 411. A translucent portion 413 is disposed on the case 411, in order for sunlight to go through the translucent portion 413 to shine into the accommodation room 412 to shine upon *Houttuynia cordata*. Talking to the current embodiment, the cultivating carrier 41 is made of a traditional 20 ft container, and the plurality of transparent portion 413 are disposed at the top surface and lateral surfaces of the long sides of the container. The transparent portion 413 is a translucent cover and made by acrylic. Through the translucent acrylic cover, the *Houttuynia cordata* in the container receives natural sunlight, instead of the traditional planting factory that adopts a large number of LED lights. Obviously, the natural sunlight is saving a lot of power cost, thus the present invention is much more economic.

The hydroponic module 42 is disposed in the accommodation room 412 of the cultivating carrier 41, and includes a plurality of hydroponic culture medium tanks 421, connecting tubes 422 and control volves 423 for planting the *Houttuynia cordata*. The *Houttuynia cordata* is planted in the hydroponic culture medium tanks 421. The connecting tube 422 is connected with the hydroponic culture medium tank 421 and the *Houttuynia cordata* hydroponic culture medium storage device 43. The control valve 423 is a switch disposed at the connecting tube 422 for controlling the connecting tube 422. About some embodiments, the hydroponic module 42 can be divided into two types: the floor-standing hydroponic planting bed module and the horizontal hydroponic planting tube module. Each of the hydroponic modules 42 is equipped with the *Houttuynia cordata* hydroponic culture medium storage device 43 for a whole cycle.

In addition, each set of the hydroponic module 42, including the hydroponic culture medium tank 421, the connecting tube 422 and the control volve 423, is designed to be flexibly dismantled for conveniently cooperating with different types of container factory outputs or plantings in the future.

Figure 4:
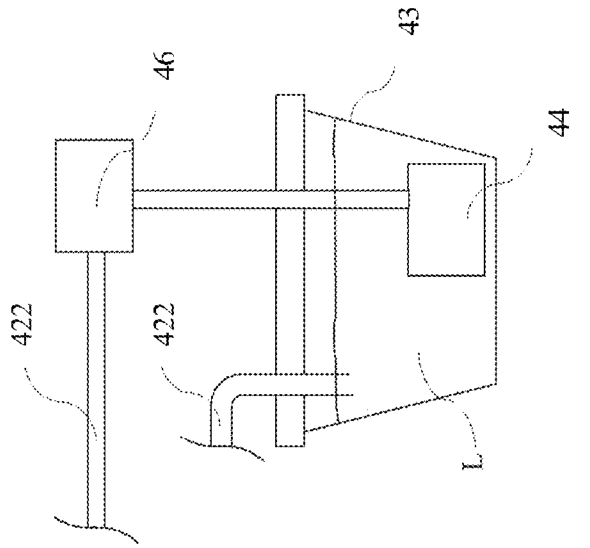
FIG. 4 illustrates a lateral sectional view of a *Houttuynia cordata* hydroponic culture medium storage device.

The *Houttuynia cordata* hydroponic culture medium storage device 43 is connected with the hydroponic module 42, and provides a *Houttuynia cordata* hydroponic culture medium L, which is supplemented to the hydroponic culture medium tank 421 via the *Houttuynia cordata* hydroponic culture medium storage device 43, for the *Houttuynia cordata* planted in the hydroponic culture medium tank 421 obtaining enough nutrition. With reference to FIG. 4, the *Houttuynia cordata* hydroponic culture medium storage device 43 further has a water pump 44, in order to recycle the *Houttuynia cordata* hydroponic culture medium L back to the *Houttuynia cordata* hydroponic culture medium storage device 43 from the hydroponic module 42. For some embodiments, the *Houttuynia cordata* hydroponic culture medium storage device 43 has a culture medium bucket.

The *Houttuynia cordata* hydroponic culture medium L in the *Houttuynia cordata* hydroponic culture medium storage device 43 adopts aforesaid the ingredients of the culture medium, and it has plant fertilizers and a *Houttuynia cordata* growth-promoting additive, and the *Houttuynia cordata* growth-promoting additive is selected from the groups consisting of: vitamin B complex, seaweed essence, amino acid, microorganism, and a combination thereof. Specifically, the four sets of the *Houttuynia cordata* hydroponic culture medium storage devices 43 contain four kinds of the *Houttuynia cordata* hydroponic culture mediums individually, and they are vitamin B complex, seaweed essence, amino acid, and microorganism, but not limited thereto. Further, the *Houttuynia cordata* hydroponic mediums L in the four sets of the *Houttuynia cordata* hydroponic culture medium storage devices 43 may be partially or totally the same, and it depends on the practical conditions.

Figure 3:
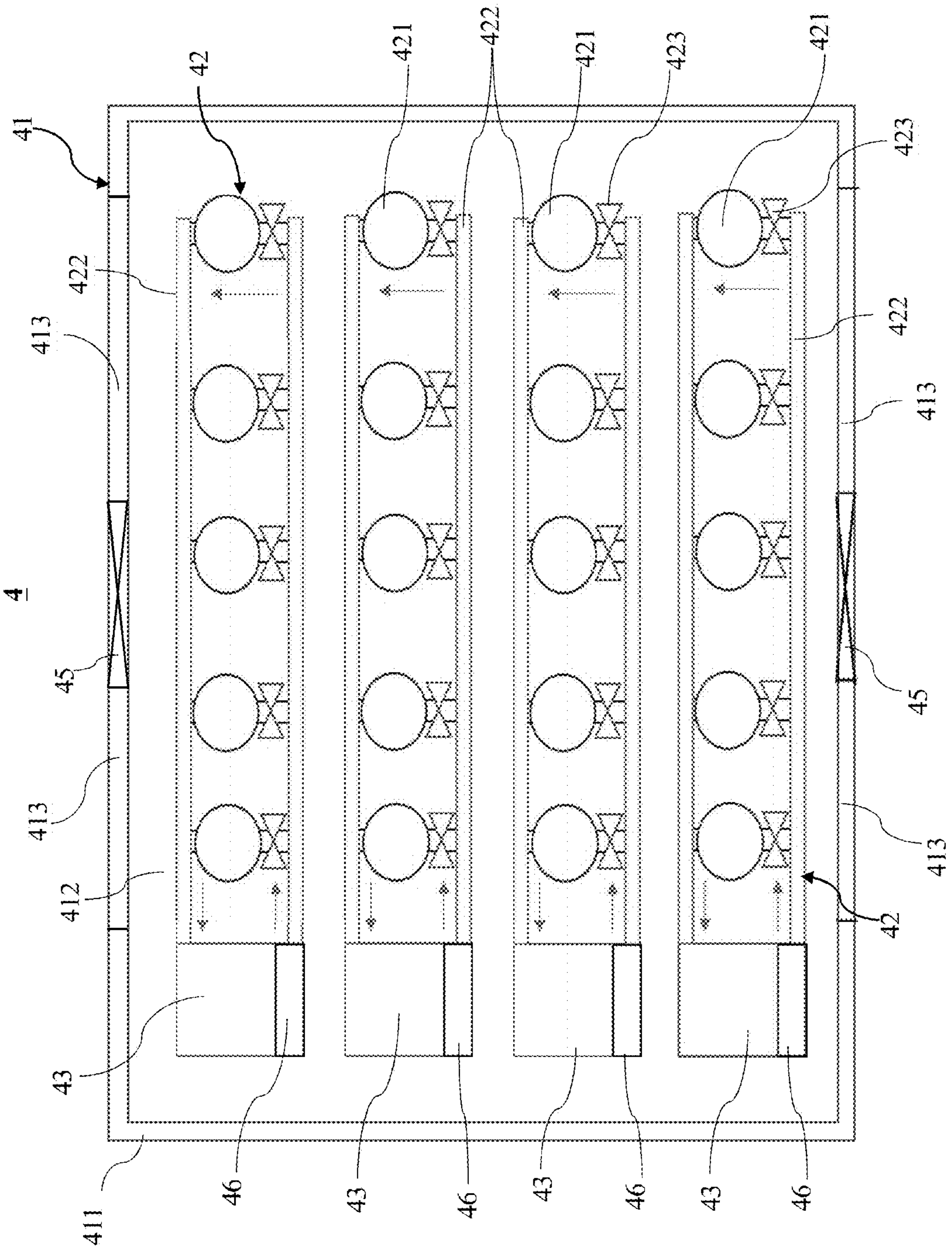
FIG. 3 illustrates a top sectional view of a *Houttuynia cordata* hydroponic planting system of the present invention.

With respect to FIG. 3 and FIG. 4, the *Houttuynia cordata* hydroponic planting system 4 further has an accommodation room temperature control device 45 that is to control the temperature of the accommodation room 412. The temperature range between 20° C. and 32° C. is better for the *Houttuynia cordata*. For some embodiments, the accommodation room temperature control device 45 is a negative pressure fan. The *Houttuynia cordata* hydroponic planting system 4 further has a culture medium temperature control device 46, in order to control the temperature of the *Houttuynia cordata* hydroponic culture medium L. As shown in some embodiments, the culture medium temperature control device 46 is a small water-cooling machine for cooling the *Houttuynia cordata* hydroponic culture medium L to keep the temperature not higher than 25° C. This is to avoid excessive temperature of *Houttuynia cordata* hydroponic culture medium L due to climate change or other factors, which will affect the growth condition, variety and speed of the hydroponic *Houttuynia cordata.*

Figure 5:
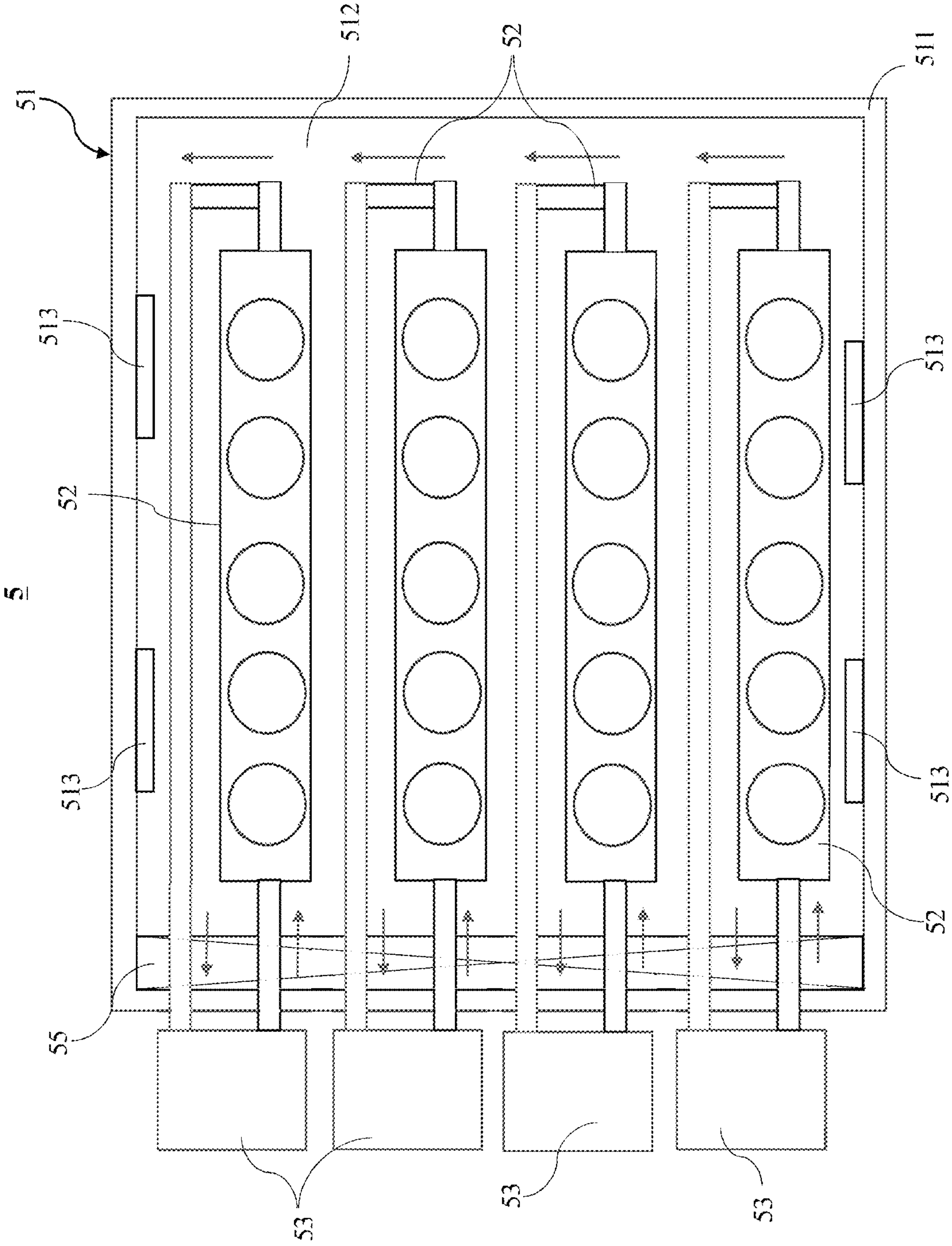
FIG. 5 illustrates a top sectional view of a *Houttuynia cordata* hydroponic planting system of the present invention.

Regarding to FIG. 5, which illustrates another *Houttuynia cordata* hydroponic planting system 5, including a cultivating carrier 51, a hydroponic module 52 and a *Houttuynia cordata* hydroponic culture medium storage device 53. The *Houttuynia cordata* hydroponic culture medium storage device 53 is connected with the hydroponic module 52, in order to supplement the *Houttuynia cordata* hydroponic culture medium L to the hydroponic module 52. For the embodiment, there are four sets of the hydroponic modules 52 and the *Houttuynia cordata* hydroponic culture medium storage devices 53 disposed in the cultivating carrier 51.

The cultivating carrier 51, the hydroponic module 52 and the *Houttuynia cordata* hydroponic culture medium storage device 53 of the *Houttuynia cordata* hydroponic planting system 5 are similar to the cultivating carrier 41, the hydroponic module 42 and the *Houttuynia cordata* hydroponic culture medium storage device 43 of the *Houttuynia cordata* hydroponic planting system 4 in the aspects of the structures and functions. The main difference between is the *Houttuynia cordata* hydroponic culture medium storage device 53 is outside a case 511 of the cultivating carrier 51, but the *Houttuynia cordata* hydroponic culture medium storage device 43 is inside the case 411 of the cultivating carrier 41. Thus, for the *Houttuynia cordata* hydroponic planting system 5, an accommodation room 512 of the cultivating carrier 51 may not be occupied by the *Houttuynia cordata* hydroponic culture medium storage device 53. It will have more room for the hydroponic module 52 for increasing the area of planting the hydroponic *Houttuynia cordata* to manufacturing.

The case 511 has also a translucent portion 513 in order for sunlight to go through the translucent portion 513 to shine into the accommodation room 412. For the embodiment, the translucent portion 513 can be a window or an opening, but not limited thereto. The *Houttuynia cordata* hydroponic planting system 5 further has an accommodation room temperature control device 55 that is to control the temperature of the accommodation room 512. The accommodation room temperature control device 55 is a negative pressure fan. The *Houttuynia cordata* hydroponic planting system 5 further has a culture medium temperature control device (not shown in figure), in order to control the temperature of the *Houttuynia cordata* hydroponic culture medium.

In the preferred embodiment, the *Houttuynia cordata* hydroponic planting system 5 adopts the *Houttuynia cordata* hydroponic culture medium storage device 53 that has the *Houttuynia cordata* hydroponic culture medium L as aforesaid. The ingredients of the *Houttuynia cordata* hydroponic culture medium L has a plant fertilizers and a *Houttuynia cordata* growth-promoting additive, wherein the *Houttuynia cordata* growth-promoting additive is selected from the groups consisting of: vitamin B complex, seaweed essence, amino acid, microorganism, and a combination thereof. The pH value of the *Houttuynia cordata* hydroponic culture medium is between 5.5 and 7.0, preferably is 5.5, 5.6, 5.7, 5.8, 5.9, 6.0, 6.1, 6.2, 6.3, 6.4, 6.5, 6.6, 6.7, 6.8, 6.9, or 7.0, and the electricity conductivity value of the *Houttuynia cordata* hydroponic culture medium is between 0.4 ms/cm and 2.0 ms/cm, preferably 0.4 ms/cm, 0.5 ms/cm, 0.6 ms/cm, 0.7 ms/cm, 0.8 ms/cm, 0.9 ms/cm, 1.0 ms/cm, 1.1 ms/cm, 1.2 ms/cm, 1.3 ms/cm, 1.4 ms/cm, 1.5 ms/cm, 1.6 ms/cm, 1.7 ms/cm, 1.8 ms/cm, 1.9 ms/cm, or 2.0 ms/cm. Further, natural plant extracts are included as well and extracted from one of the groups consisting of: *Houttuynia cordata* leaf, camphor leaf, juniper leaf, xiaonan (Incense Cedar) leaf, and a combination thereof. For other embodiments, the microorganisms include *Azotobacter*, lactic acid bacteria, phosphate solubilizer, yeast, potassium solubilizer, *Bacillus subtilis*, etc. and other single or unlimited strains of combined flora.

The plantation of *Houttuynia cordata* is through the *Houttuynia cordata* hydroponic planting systems 4 and 5 and the *Houttuynia cordata* hydroponic culture medium, and thus the *Houttuynia cordata* extract can be obtained by air-drying, taking 10 g of *Houttuynia cordata* for powdering, adding 500 ml of 95% ethanol for extraction, ultrasonic vibration for 1 hour, filtration, and solvent removal. The formula for calculating the extraction rate of the *Houttuynia cordata* extract is the weight after extraction (mg)/original weight (mg)×100%, and the results of the relevant extraction rates are shown in table 4 below. The extraction rate for the hydroponic *Houttuynia cordata* adding the seaweed essence is 7.84%. After comparing with 10.91% of the extraction rate of the traditional soil cultivation, the extraction rate is greater than or equal to 71.9% of the traditional soil cultivation. That is, the original expected target is achieved, although the extraction rate for the hydroponic *Houttuynia cordata* is lower than the soil-cultivated ones. Further, the growth period is only half of the soil-cultivated ones, hence the production is twice than soil-cultivated ones.

TABLE 4

| | Soil cultivation | Hydroponic *Houttuynia cordata* Adding With Growth-promoting Additive | | | |
|---|---|---|---|---|---|
| | *Houttuynia cordata* | Vitamin B complex | Seaweed essence | Amino acid | Micro-organism |
| Extraction technology | 95% ethanol extraction | | | | |
| Weight before extraction | 10.01 g | 10.01 g | 10.00 g | 10.00 g | 10.01 g |
| Weight after extraction | 1091.83 mg | 689.0 mg | 784.3 mg | 592.0 mg | 636.0 mg |
| Extraction rate | 10.91% | 6.89% | 7.84% | 5.92% | 6.36% |

Then, adding 1 mg of *Houttuynia cordata* extract weighing 1 mL of HPLC grade methanol is to obtain a sample with a concentration of 1 mg/mL solvent, and it is filtered through a 0.22 μL filter. The HPLC instruments and appropriate conditions are analyzed to obtain chromatographic fingerprint of chemical markers. Please refer to table 2, table 3, FIG. 1, and FIGS. 2A~2D, the caffeic acid derivatives corresponding to the retention time between 8 and 13 can be obtained after analysis, and the peak area of each retention time of the caffeic acid derivatives is between 447834 and 1689264. Every flavonoid corresponding to its retention time is between 17.5 to 19.5 and 23.5 to 24.5. The peak area of these two flavonoid periods is from 265716 to 2229774, so it can be known that the *Houttuynia cordata* extract contains flavonoids and caffeic acid derivatives.

Due to the high ingredient of flavonoids and caffeic acid derivatives in this *Houttuynia cordata* extract, the *Houttuynia cordata* extract of the present invention is for preparing compositions with antiviral, anti-inflammatory, antitumor, antioxidative and antibacterial effects, wherein a method for manufacturing *Houttuynia cordata* extracts comprises that of: providing a *Houttuynia cordata* hydroponic culture medium to a *Houttuynia cordata* by means of hydroponic planting, wherein the *Houttuynia cordata* hydroponic culture medium comprises a plant fertilizers and a *Houttuynia cordata* growth-promoting additive, and the *Houttuynia cordata* growth-promoting additive is selected from the groups consisting of: vitamin B complex, seaweed essence, amino acid, microorganism, and a combination thereof; adopting a *Houttuynia cordata* hydroponic planting system (4) to hydroponically plant the *Houttuynia cordata*, wherein the *Houttuynia cordata* hydroponic planting system (4) comprises a *Houttuynia cordata* hydroponic culture medium storage device (43) for sunlight shining upon the *Houttuynia cordata*; and extracting the *Houttuynia cordata* by ethanol to obtain the *Houttuynia cordata* extract, wherein the *Houttuynia cordata* is processed by the *Houttuynia cordata* hydroponic planting system (4) and the *Houttuynia cordata* hydroponic culture medium; wherein the *Houttuynia cordata* extract comprising flavonoids and caffeic acid derivatives, and a concentration of the *Houttuynia cordata* extract acting on an chromatographic fingerprint of chemical markers is 1 mg/1 mL solvent, in order to obtain the caffeic acid derivatives corresponding to a retention time between 8 and 13, a peak area of the retention time of the caffeic acid derivatives ranges from 447834 to 1689264, and flavonoids corresponding to the retention times between 17.5 to 19.5 and 23.5 to 24.5, and the peak area of the retention time of the flavonoids is between 265716 and 2229774. For some embodiments, the microorganism is selected from the group consisting of: *Azotobacter*, lactic acid bacteria, phosphate solubilizer, yeast, potassium solubilizer or *Bacillus subtilis* and other single or combined flora with unlimited strains and species.

The ingredients of the *Houttuynia cordata* hydroponic culture medium selected by the present invention can effectively promote the growth rate of the *Houttuynia cordata*, so that the growth cycle time required for the *Houttuynia cordata* from the beginning of plantation to harvest is reduced compared with the traditional soil-cultivated ones. Relatively speaking, the hydroponic production capacity of the present invention is capable of rising at least one time (including more) than that of the traditional soil cultivation, so it can successfully increase the production capacity to meet industrial demands.

The *Houttuynia cordata* hydroponic planting system of the present invention is advanced by traditional container, by replacing LED lights with natural sunlight to shine upon the *Houttuynia cordata*. Hence, the present invention saves a large number of costs compared with the present hydroponic planting's.

The planted *Houttuynia cordata* from aforesaid *Houttuynia cordata* hydroponic culture medium and *Houttuynia cordata* hydroponic planting system is extracted through air-drying, powdering, adding ethanol for extraction, ultrasonic vibration, filtration, and solvent removal to obtain the *Houttuynia cordata* extract, which contains the high amounts of flavonoids and caffeic acid derivatives as ingredients. Therefore, the *Houttuynia cordata* extract successfully prepares compositions with antiviral, anti-inflammatory, antitumor, antioxidative and antibacterial effects.

Although the invention has been disclosed and illustrated with reference to particular embodiments, the principle involved are susceptible for use in numerous other embodiments that will be apparent to persons skilled in the art. This invention is, therefore, to be limited only as indicated by the scope of the appended claims.

What is claimed is:

1. A hydroponic cultivation method for *Houttuynia cordata*, comprising:

(S1) providing at least one *Houttuynia cordata*, wherein a leaf size of each of the *Houttuynia cordata* is greater than or equal to 3 cm;

(S2) applying a *Houttuynia cordata* hydroponic culture medium to each of the *Houttuynia cordata* to perform hydroponic cultivation for 45 to 60 days, wherein the *Houttuynia cordata* hydroponic culture medium comprises:

a plant fertilizer; and a *Houttuynia cordata* growth-promoting additive;

wherein the *Houttuynia cordata* growth-promoting additive is selected from the group consisting of: vitamin B complex, seaweed essence, amino acid, microorganism, and a combination thereof;

wherein an electronic conductivity of the *Houttuynia cordata* hydroponic culture medium is between 0.4 ms/cm and 2.0 ms/cm; and (S3) harvesting each the *Houttuynia cordata*, wherein each the harvested *Houttuynia cordata* has the leaf size greater than or equal to 7 cm.

2. The hydroponic cultivation method for *Houttuynia cordata* according to claim 1, wherein a pH value of the *Houttuynia cordata* hydroponic culture medium is between 5.5 and 7.0.

3. The hydroponic cultivation method for *Houttuynia cordata* according to claim 1, wherein the microorganism is selected from the group consisting of: *Azotobacter*, lactic acid bacteria, phosphate solubilizer, yeast, potassium solubilizer, *Bacillus subtilis*, and a combination thereof.

4. The hydroponic cultivation method for *Houttuynia cordata* according to claim 1, wherein the *Houttuynia cordata* hydroponic culture medium further comprises natural plant extracts, which are extracted from one of the groups consisting of: *Houttuynia cordata* leaf, camphor leaf, juniper leaf, xiaonan (Incense Cedar) leaf, and a combination thereof.

5. The hydroponic cultivation method for *Houttuynia cordata* hydroponic culture medium-according to claim 2, wherein the *Houttuynia cordata* hydroponic culture medium further comprises natural plant extracts, which are extracted from one of the groups consisting of: *Houttuynia cordata* leaf, camphor leaf, juniper leaf, xiaonan (Incense Cedar) leaf, and a combination thereof.

6. The hydroponic cultivation method for *Houttuynia cordata* hydroponic culture medium-according to claim 3, wherein the *Houttuynia cordata* hydroponic culture medium further comprises natural plant extracts, which are extracted from one of the groups consisting of: *Houttuynia cordata* leaf, camphor leaf, juniper leaf, xiaonan (Incense Cedar) leaf, and a combination thereof.

* * * * *